(12) United States Patent
 Pan et al.

(10) Patent No.: US 9,578,444 B1
(45) Date of Patent: Feb. 21, 2017

(54) AUTOMATIC SWITCHING SYSTEM AND METHOD FOR SMART SWITCH

(71) Applicant: LUXUL TECHNOLOGY INCORPORATION, New Taipei (TW)

(72) Inventors: Cheng-Hung Pan, New Taipei (TW); Perng-Fei Yuh, New Taipei (TW); Shiun-Shang Chan, New Taipei (TW)

(73) Assignee: LUXUL TECHNOLOGY INCORPORATION, New Taipei (TW)

( * ) Notice: Subject to any disclaimer, the term of this patent is extended or adjusted under 35 U.S.C. 154(b) by 0 days.

(21) Appl. No.: 15/165,396

(22) Filed: May 26, 2016

(30) Foreign Application Priority Data

Mar. 7, 2016 (TW) .............................. 105106861 A

(51) Int. Cl.
 *H04B 7/00* (2006.01)
 *H04W 4/00* (2009.01)
 *H04W 76/02* (2009.01)
 *H04L 12/28* (2006.01)
 *H05B 37/02* (2006.01)
 *H04W 84/12* (2009.01)

(52) U.S. Cl.
 CPC .......... *H04W 4/005* (2013.01); *H04L 12/2801* (2013.01); *H04W 76/023* (2013.01); *H05B 37/0272* (2013.01); *H04W 84/12* (2013.01)

(58) Field of Classification Search
 None
 See application file for complete search history.

(56) References Cited

U.S. PATENT DOCUMENTS

| 9,413,171 | B2* | 8/2016 | Neyhart | H04L 12/2807 |
| 2005/0253538 | A1* | 11/2005 | Shah | H05B 37/0272 315/362 |
| 2008/0218099 | A1* | 9/2008 | Newman | H05B 39/088 315/268 |
| 2008/0218307 | A1* | 9/2008 | Schoettle | G05B 19/042 340/3.1 |
| 2009/0206983 | A1* | 8/2009 | Knode | G08C 17/02 340/3.7 |
| 2010/0244706 | A1* | 9/2010 | Steiner | G01J 1/02 315/149 |
| 2010/0283401 | A1* | 11/2010 | Chung | H05B 37/0263 315/250 |

(Continued)

*Primary Examiner* — Tuan A Tran
(74) *Attorney, Agent, or Firm* — Lynette Wylie; Apex Juris, PLLC.

(57) ABSTRACT

An automatic switching method for a smart switch is implemented in an automatic switching system having a mobile device, a wireless station, a CPnP server and at least one match switch. The method includes steps of: developing match data for establishing relationship between the mobile device and the matching switch in the CPnP server; and establishing a connection between the mobile device and the match switch by a user operation to control the match switch. When the mobile device is within wireless signal range of the wireless station to be connected with the match switch via the wireless station, the mobile device controls the match switch through the wireless station. When the mobile device is located outside the wireless signal range of the wireless station to be connected with the match switch via the CPnP server, the mobile device controls the match switch via the CPnP server.

7 Claims, 4 Drawing Sheets

(56) References Cited

U.S. PATENT DOCUMENTS

| | | | |
|---|---|---|---|
| 2012/0086561 A1* | 4/2012 | Ilyes | H05B 37/0227 340/12.32 |
| 2012/0235579 A1* | 9/2012 | Chemel | F21S 2/005 315/152 |
| 2014/0163751 A1* | 6/2014 | Davis | H04L 12/12 700/286 |
| 2014/0175875 A1* | 6/2014 | Newman, Jr. | H04L 69/18 307/18 |
| 2014/0177469 A1* | 6/2014 | Neyhart | H04L 12/2807 370/254 |
| 2014/0180487 A1* | 6/2014 | Bull | H04L 12/12 700/295 |
| 2016/0149411 A1* | 5/2016 | Neyhart | H04L 12/2807 700/295 |

\* cited by examiner

AUTOMATIC SWITCHING SYSTEM AND METHOD FOR SMART SWITCH

CROSS-REFERENCE TO RELATED APPLICATIONS

This application claims the benefit of Taiwan patent application No. 105106861, filed on Mar. 7, 2016, the disclosure of which is incorporated herein in its entirety by reference.

BACKGROUND OF THE INVENTION

1. Field of the Invention

The present invention relates to an automatic switching system and method for a smart switch, and more particularly to an automatic switching system and method for a smart switch capable of automatically switching between local control and remote control.

2. Description of Related Art

Since economy grows so fast and many office constructions are built in urban areas, office space at each floor of the construction buildings or each of the offices requires lamps to provide illumination. Normally, it is common to see many lamps in one office at the same time. However, not everyone is familiar with the installation locations of the lamp switches and it is very inconvenient for people to find out where the lamp switch is in the darkness. In addition, the conventional lamps can provide light source with fixed illumination, but when ambient luminance exists or when the ambient luminance varies during day time and night time, the light source with fixed illumination does not meet the demand. Therefore, the power is wasted and the cost for the company is increased. Accordingly, a conventional switch control system can remotely control electronic devices (such as lamps and so on) and the electronic devices can be controlled at anytime and anywhere to eliminate the inconvenience to switch on or off the electronic devices.

As shown in FIG. 4, the conventional switching control system 40 includes a mobile device 41, a commercial/consumer plug and play (CPnP) server 42, at least one match switch 43 and a wireless station 44. Each of the match switches 43 includes a wi fi adapter 431.

The mobile device 41 is connected with the CPnP server 42 via Internet. The wi fi adapter 431 of the match switch 43 is connected with the wireless station 44 via an Intranet and the match switch 43 may be connected with the CPnP server 42 through the wireless station 44 via the Internet. Therefore, the mobile device 41 and the match switch 43 can be connected with the CPnP server 42 at the same time. Even when the user is not in the office, the user can use the mobile device 41 to remotely control the match switch 43 via the CPnP server 42.

However, in the conventional switching control system 40, when the mobile device 41 performs the operation at any location, the mobile device 41 is required to be connected with the CPnP server 42. For example, the wireless station 44 is installed in the office and the match switch 43 can control one lamp in the office. When the user is in the office, the mobile device 41 is connected with the CPnP server 42 via the Internet through the wireless station 44 and the mobile device 41 can control the match switch 43 via the CPnP server 42. When the user is not in the office, the mobile device 41 may be connected with the CPnP server 42 via the Internet through a different wireless station or 3G/4G telecommunication technique and the mobile device 41 can also control the match switch 43 via the CPnP server 42. In other words, no matter where the mobile device 41 is, the mobile device 41 is required to be connected with the CPnP server 42 so as to control the match switch 43. Therefore, when the number of the mobile devices 41 connectable with the CPnP server 42 is increased and a large number of the mobile devices 41 are connected with the CPnP server 42 to control the match switch 43, it causes a burden to the CPnP server 42 and slows down the data transfer.

Therefore, according to the aforementioned problems, a solution to reduce the burden of the CPnP server and improve the performance of the switching control system is required.

SUMMARY OF THE INVENTION

According to the drawbacks of the conventional technique, an objective of the present invention is to provide an automatic switching method for a smart switch to automatically switch between remote control and local control to reduce the burden of the CPnP server.

In order to achieve the aforementioned objective, an automatic switching method for a smart switch implemented in an automatic switching system for the smart switch and the system includes a mobile device, a wireless station, a commercial/consumer plug and play (CPnP) server, and at least one match switch connected with the wireless station, and the method comprises the following steps: a step of developing a match data for establishing a relationship between a mobile device and the at least one matching switch in the CPnP server; a step of establishing a connection between the mobile device and the at least one match switch by a user operation to control the at least one match switch; a step of determining if a first internet protocol (IP) address of the mobile device and a second IP address of the at least one match switch are in the same local area network (LAN) by the mobile device when the mobile device is within wireless signal range of the wireless station to be connected with the at least one match switch; and the mobile device controlling the at least one match switch directly via the wireless station; and a step of determining if the first IP address of the mobile device and the second IP address of the at least one match switch are in different LANs by the mobile device when the mobile device is located outside the wireless signal range of the wireless station and is connected with the at least one match switch via the CPnP server and the wireless station, and the mobile device controlling the at least one match switch in accordance with the match data via the CPnP server.

Another objective of the present invention is to provide an automatic switching system for a smart switch, and the automatic switching system can automatically switch between the remote control and the local control. When operating in the local control, the mobile device and the match switch in the automatic switching system are not required to be connected with the CPnP server to reduce the burden of the CPnP server.

According to the aforementioned objective, an automatic switching system for a smart switch provided in the present invention comprises a mobile device, a CPnP server, a wireless station, and at least one match switch. The CPnP server and the mobile device are able to be connected with the CPnP server via Internet. The wireless station has an SSID and the mobile device is able to be connected with the wireless station via the SSID. Each of the at least one match switch includes a wi fi adapter, and the at least one match switch is wirelessly connected with the wireless station via the wi fi adapter, and the wireless station is connected with the CPnP server via the Internet. When the mobile device is within wireless signal range of the wireless station to be connected with the at least one match switch via the wireless station and detects that a first internet protocol (IP) address of the mobile device and a second IP address of the at least one match switch are in a same local area network (LAN), the mobile device controls the at least one match switch directly through the wireless station. When the mobile device is located outside the wireless signal range of the wireless station and is connected with the at least one match switch via the CPnP server and the wireless station and the mobile device detects that the first IP address of the mobile device and the second IP address of the at least one match switch are in different LANs, the mobile device controls the at least one match switch in accordance with the match data via the CPnP server.

The automatic switching system for the smart switch in the present invention may switch between the local control and the remote control to avoid too many mobile devices being connected with the CPnP server and reduce the burden of the CPnP server.

DETAILED DESCRIPTION OF THE PREFERRED EMBODIMENT

These and other aspects of the embodiments herein will be better appreciated and understood when considered in conjunction with the following description and the accompanying drawings.

Figure 1:
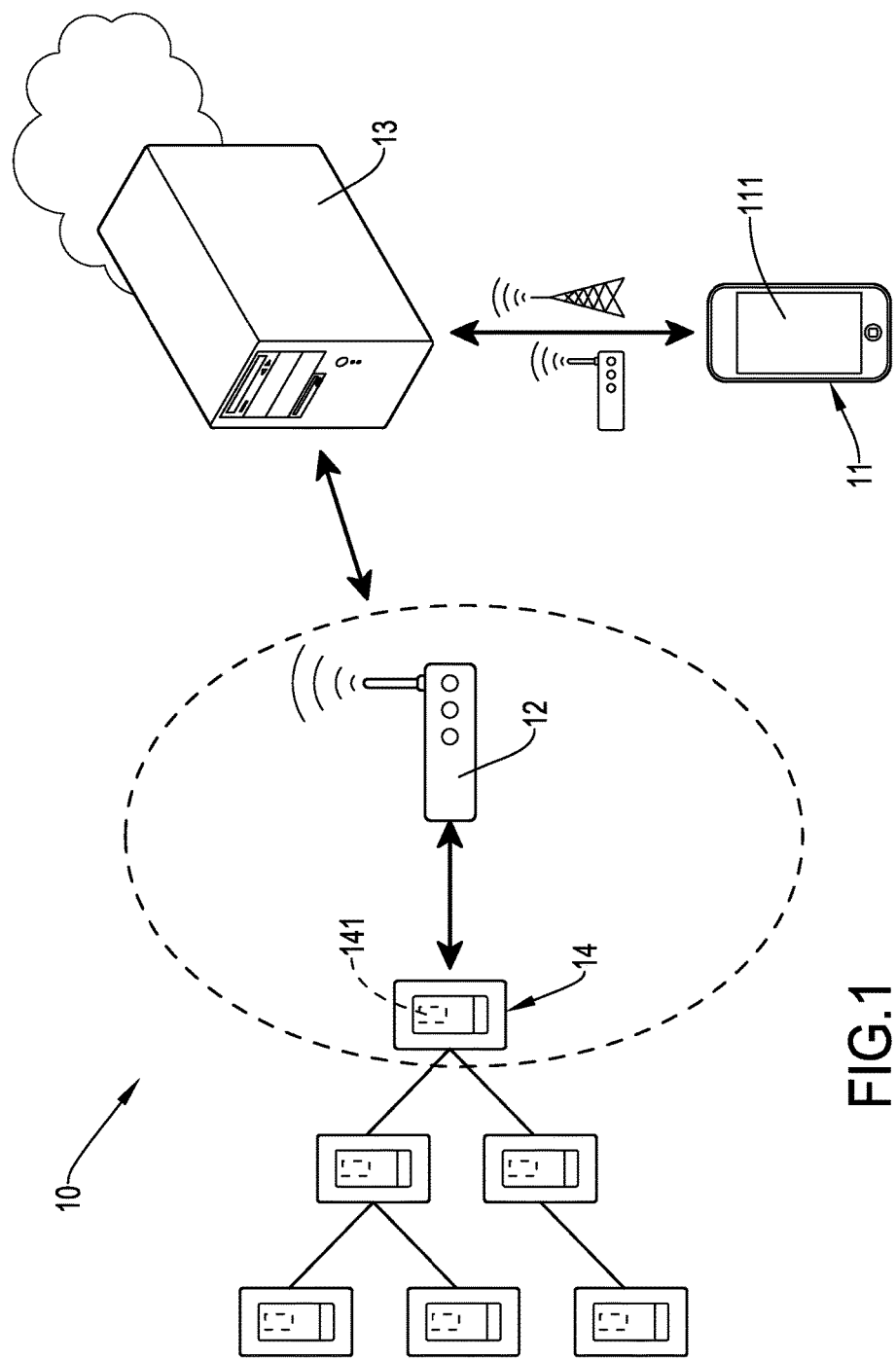
FIG. 1 is a view of an automatic switching system for a smart switch in the present invention.
Figure 2:
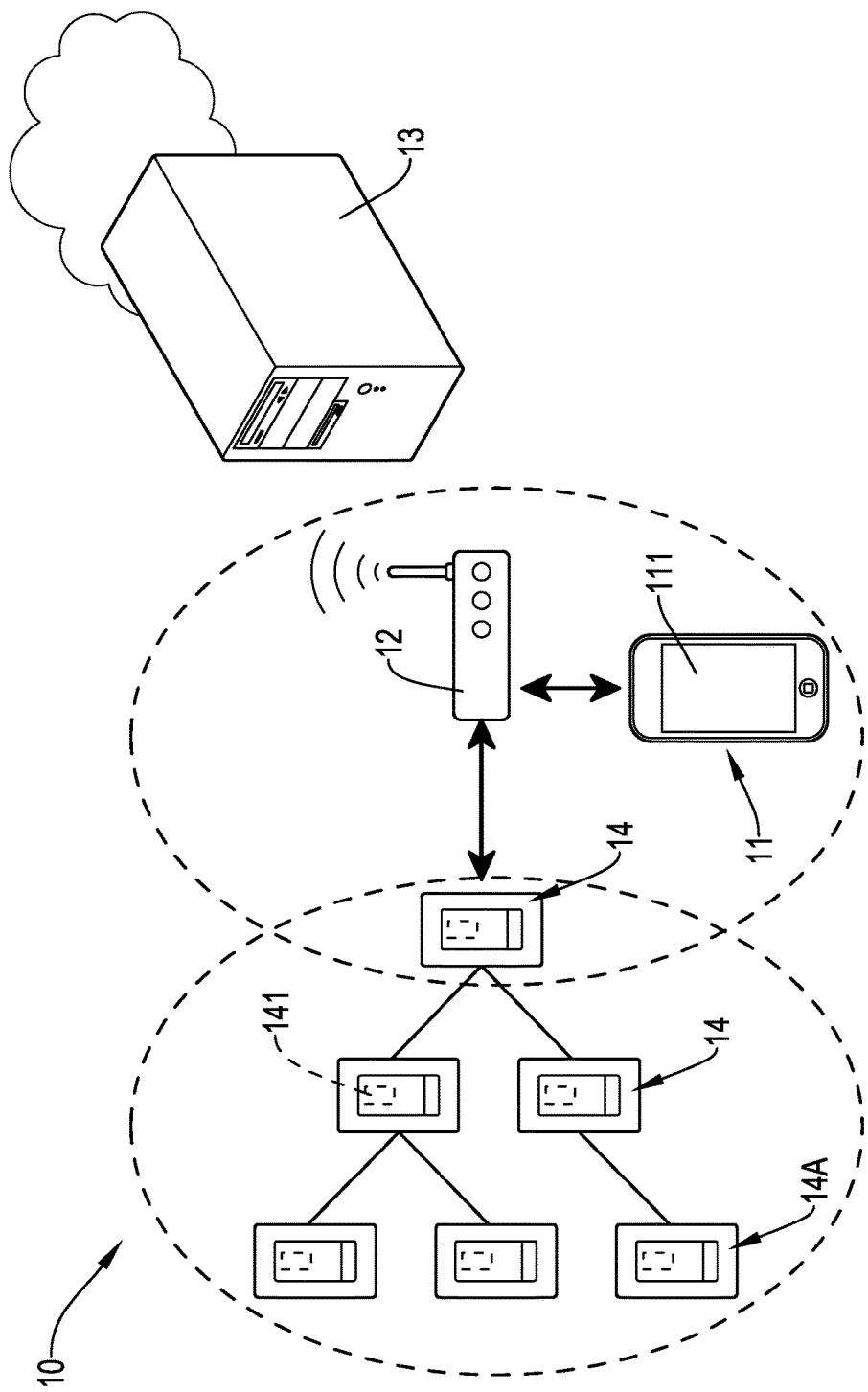
FIG. 2 is another view of an automatic switching system for a smart switch in the present invention.

FIG. 1 is a view of an automatic switching system for a smart switch of the present invention in a remote control operation and FIG. 2 is another view of the automatic switching system for a smart switch of the present invention in a local control operation. The automatic switching system 10 for the smart switch in the present invention includes a mobile device 11, a wireless station 12, a CPnP server 13 and at least one match switch 14.

The mobile device 11 may be a smart phone, a tablet or a laptop, but it is not limited herein. The mobile device 11 may be connected with the Internet via 3G or 4G telecommunication technique or the wireless station 12, so the mobile device 11 may be connected with the CPnP server 13 via the Internet. The at least one match switch 14 each includes a wi fi adapter 141. The match switch 14 may be wirelessly connected with the wireless station 12 via the wi fi adapter 141 so as to be connected with the Internet. Therefore, the match switch 14 may be connected with the CPnP server 13 via the Internet. When the connection between the mobile device 11 and the match switch 14 is established, match data for establishing a relationship between the mobile device 11 and the match switch 14 is also developed in the CPnP server 13. For example, the match data is a registration data of the mobile device 11 and a code of the match switch 14. The registration data of the mobile device 11 and the code of the match switch 14 are uploaded to the CPnP server 13 by the operation of the user, so the mobile device 11 may control the corresponding match switch 14 via the CPnP server 13 in accordance with the match data.

With reference to FIG. 1, the mobile device 11 does not enter the same wireless station 12 as the match switch 14. The mobile device 11 is connected with the Internet via another wireless station or 3G/4G telecommunication technique. At this moment, a first Internet Protocol (IP) address of the mobile device 11 is not within a local area network (LAN) of the match switch 14. Specifically, a smart switch control interface 111 of the mobile device 11 recognizes a second IP address of the match switch 14 is a real IP address and the first IP address of the mobile device 11 is also a real IP address, so the mobile device 11 is known to be in the LAN different from the LAN of the match switch 14. The mobile device 11 controls the match switch 14 through the CPnP server 13 via the Internet. The smart switch control interface 111 of the mobile device 11 is operated by the user to login the CPnP server 13, and the corresponding match switches 14, which are available to be operated, are shown on the smart switch control interface 111 of the mobile device 11. Therefore, the match switch 14 is operated via the smart switch control interface 111. In addition, when the mobile device 11 operates the match switch 14 through the CPnP server 13 via the Internet, the CPnP server 13 performs data transfer between the mobile device 11 and the wireless station 12 in an encrypted manner, such as MD5 (Message Digest 5) or AES 256 (Advance Encryption Standard 256).

It should be noted that the smart switch control interface 111 may be application software in the mobile device 11. The smart switch control interface 111 will show the automatic switching system 10 is in a remote control mode or a local control mode and also shows which one of the smart switches 14 is still online. The smart switch control interface 111 includes the function to switch between the local control mode and the remote control mode and the function to operate the match switch 14 in the automatic switching system 10. However, how to design the display function and the operation function of the smart switch control interface 111 is well known for the person having ordinary skill in the art, such as software design, computer science and so on, so the detailed description for developing and designing the smart switch control interface 111 is omitted herein.

When the mobile device 11 enters a network range of the wireless station 12 of the smart switch 14, the mobile device 11 operated by the user may be connected with the wireless station 12, as shown in FIG. 2. In other words, the mobile device 11 and the match switch 14 are connected with the same wireless station 12. When the mobile device 11 and the match switch 14 are connected with the same wireless station 12, the first IP address of the mobile device 11 and the second IP address of the match switch 14 shown in the smart switch control interface 111 are virtual IP addresses within the same LAN. When the smart switch control interface 111 of the mobile device 11 recognizes the mobile device 11 and the match switch 14 having virtual IP addresses within the same LAN, the user implements the smart switch control interface 111 of the mobile device 11 to control the match switch 14 via the wireless station 12 without communicating with the CPnP server 13. In addition, it should be noted that how to detect virtual IP address or real IP address is well known for the person having ordinary skill in the art, and the detail description thereof is omitted herein. At this moment, the mobile device 11 directly controls the match switch 14 via the wireless station 12 without the CPnP server 13. The automatic switching system 10 for the smart switch in the present invention includes two different control modes (local and remote), and the remote and local control modes in the automatic switching system 10 are switched by the smart switch control interface 111. The mobile device 11 in the automatic switching system 10 is not required to control the match switch 14 through the CPnP server 13 all the time so as to reduce the burden of the CPnP server 13.

In addition, since each of the match switches 14 in the present invention includes the wi fi adapter 141, when some of the match switches 14 (as the match switch 14A shown in FIG. 2) are not within effective connection range of the same wireless station 12, as shown in FIG. 1 and FIG. 2, one of the match switches 14 is used to be a repeater and the match switch 14 is close to those match switches 14 not connected with the wireless station 12. Therefore, those match switches 14, which are not within the effective range of the wireless station 12, may be indirectly connected with the wireless station 12 through the match switch 14 used as the repeater. Accordingly, all of the match switches 14 may be directly or indirectly connected with the wireless station 12.

Figure 3:
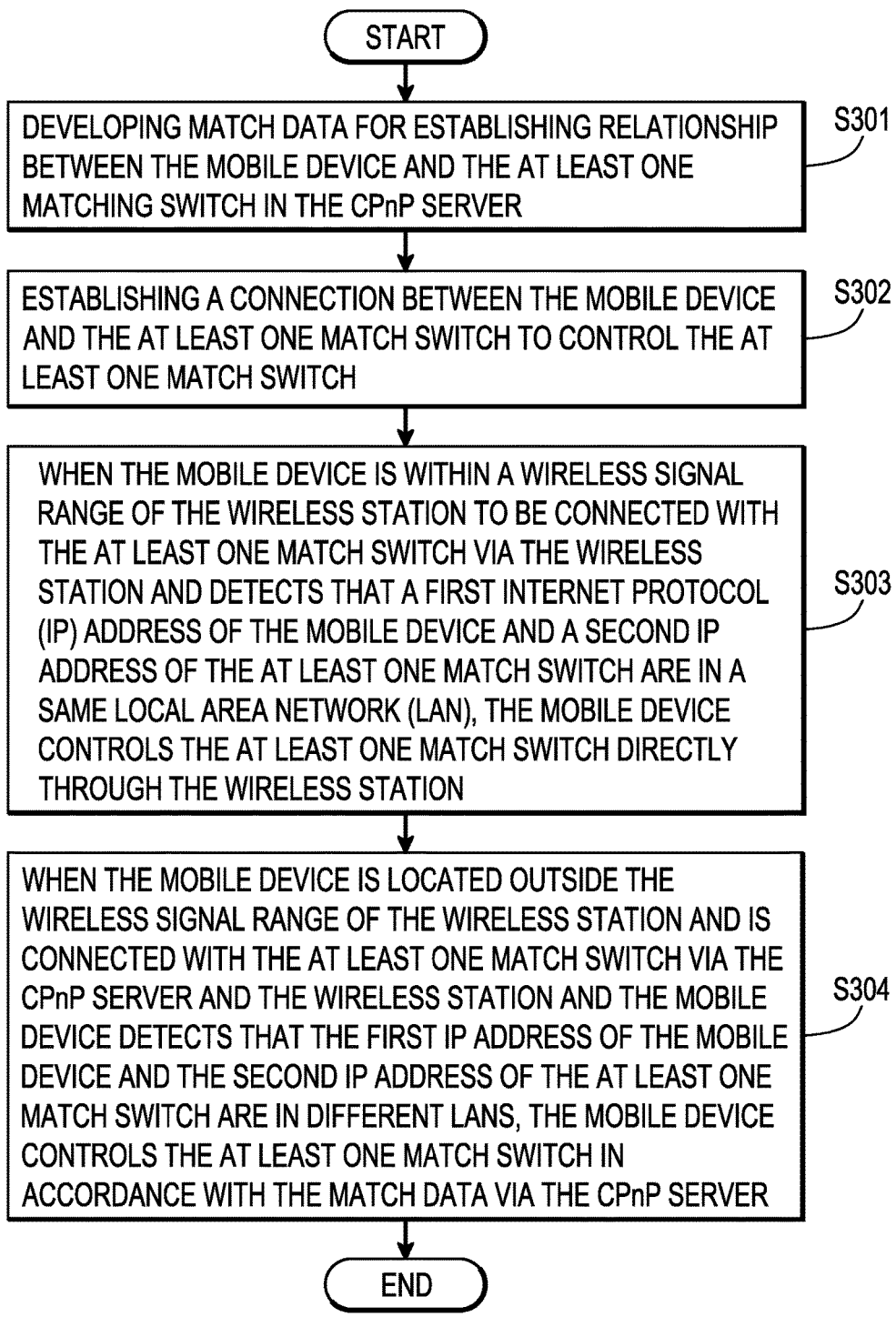
FIG. 3 is a flowchart of an automatic switching method for a smart switch in the present invention.
Figure 4:
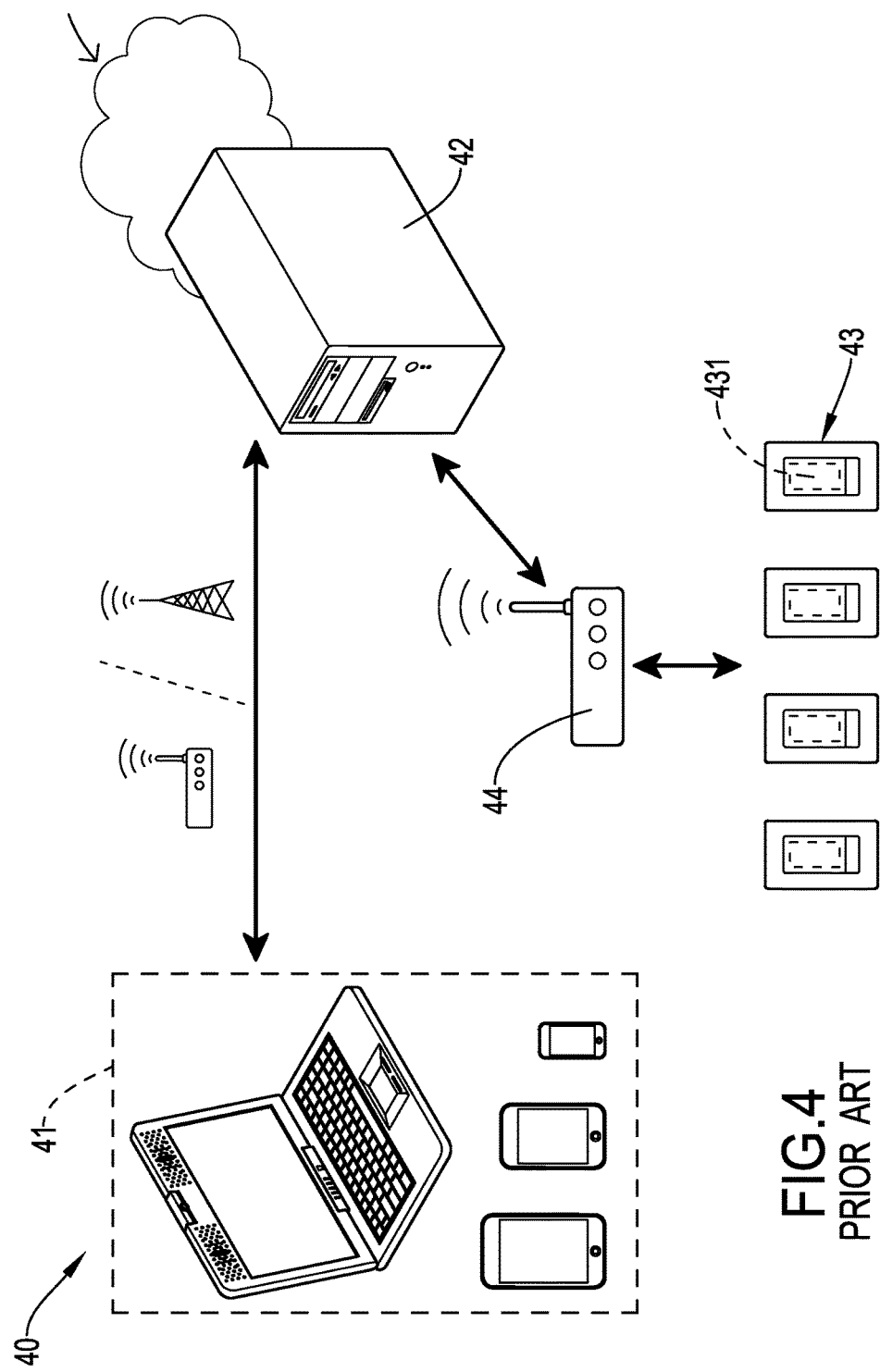
FIG. 4 is a view of a conventional switching control system.

FIG. 3 is a flowchart of the automatic switching method for the smart switch in the present invention. As shown in FIG. 3 with reference to FIG. 1 and FIG. 2, in step S301, the match data for establishing a relationship between the mobile device 11 and the at least one match switch 14 is developed in the CPnP server 13. In step S302, the mobile device 11 is connected with the at least one match switch 14 in accordance with the operation from the user and the match data to control the at least one match switch 14. In step S303, when the mobile device 11 is within wireless signal range of the wireless station 12 and is connected with the at least one match switch 14 via the wireless station 12, the mobile device 11 determines the first IP address of the mobile device 11 and the second IP address of the at least one match switch 14 are in the same LAN. The mobile device 11 directly controls the at least one match switch 14 via the wireless station 12. According to the IP addresses (real IP addresses or virtual IP address) of the mobile device 11 and the match switch 14, the smart switch control interface 111 of the mobile device 11 can clearly determine whether the mobile device 11 and the match switch 14 are in the same wireless station 12.

In step S304, when the mobile device 11 is not within the wireless signal range of the wireless station 12, the mobile device 11 is connected with the at least one match switch 14 via the CPnP server 13 and the wireless station 12. The mobile device 11 determines that the first IP address of the mobile device 11 is not within the LAN of the at least one match switch 14, and the mobile device 11 controls the at least one match switch 14 in accordance with the match data via the CPnP server 13. In the remote control mode, the data passing through the CPnP server 13 is encrypted (such as MD5 or AES 256) to enhance the security of the automatic switching system for the smart switch in the present invention.

The automatic switching system 10 for the smart switch in the present invention includes two working modes (remote and local) to reduce the burden of the CPnP server 13. In the remote control mode, since the security of the external network is not good enough, the mobile device 11 may control the match switch 14 via the CPnP server 13 to enhance the security. In the local control mote, since the local control is performed via the Intranet, the mobile device 11 directly controls the match switch 14 via the wireless station 12 without the Internet. The automatic switching system 10 for the smart switch does not need the CPnP server 13 to enhance the security and the burden of the CPnP server 13 may be reduced. Moreover, in the automatic switching system, the mobile device 11 includes a full control function for the match switch 14 in the remote control mode. For example, in the remote control mode, the mobile device 11 may control the match switch 14 to perform turning on/off, illumination adjusting or turning on/off which bulbs in the electronic products (such as lamps). In the local mode, the mobile device 11 only can control the match switch 14 to perform some functions such as turning on/off, etc in the electronic products.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. An automatic switching method for a smart switch implemented in an automatic switching system that includes a mobile device, a wireless station, a commercial/consumer plug and play (CPnP) server, and at least one match switch connected with the wireless station, and the method comprising steps of:

developing match data for establishing relationship between the mobile device and the at least one matching switch in the CPnP server; and establishing a connection between the mobile device and the at least one match switch to control the at least one match switch;

wherein when the mobile device is within a wireless signal range of the wireless station to be connected with the at least one match switch via the wireless station and detects that a first internet protocol (IP) address of the mobile device and a second IP address of the at least one match switch are in a same local area network (LAN), the mobile device controls the at least one match switch directly through the wireless station;

when the mobile device is located outside the wireless signal range of the wireless station and is connected with the at least one match switch via the CPnP server and the wireless station and the mobile device detects that the first IP address of the mobile device and the second IP address of the at least one match switch are in different LANs, the mobile device controls the at least one match switch in accordance with the match data via the CPnP server.

2. The method as claimed in claim 1, wherein the mobile device is connected with the at least one match switch via an Intranet when the mobile device directly controls the at least one match switch via the wireless station.

3. The method as claimed in claim 1, wherein the mobile device is connected with the at least one match switch via Internet through 3G/4G communication technique or another wireless station different from the wireless station of the at least one match switch when the mobile device controls the at least one match switch in accordance with the match data via the CPnP server.

4. The method as claimed in claim 1, wherein the CPnP server performs data transfer between the mobile device and the wireless station by MD5 (Message Digest 5) or AES 256 (Advance Encryption Standard 256) encryption method when the mobile device controls the at least one match switch in accordance with the match data by the CPnP server.

5. An automatic switching system, comprising:
a CPnP server;
a mobile device connected with the CPnP server via Internet;
a wireless station having an SSID (Service Set Identifier) and connected with the mobile device via the SSID; and
at least one match switch each including a wi fi adapter and being connectable with the wireless station via the wi fi adapter, and the at least one match switch connected with the CPnP server through the wireless station via the Internet;
wherein when the mobile device is within a wireless signal range of the wireless station to be connected with the at least one match switch via the wireless station and detects that a first internet protocol (IP) address of the mobile device and a second IP address of the at least one match switch are in a same local area network (LAN), the mobile device controls the at least one match switch directly through the wireless station;
when the mobile device is located outside the wireless signal range of the wireless station and is connected with the at least one match switch via the CPnP server and the wireless station and the mobile device detects that the first IP address of the mobile device and the second IP address of the at least one match switch are in different LANs, the mobile device controls the at least one match switch in accordance with the match data via the CPnP server.

6. The automatic switching system as claimed in claim 5, wherein the mobile device is a smart phone, a tablet or a laptop.

7. The automatic switching system as claimed in claim 5, wherein the mobile device is connected with the at least one match switch via an Intranet when the mobile device controls the at least one match directly via the wireless station.

* * * * *